United States Patent Office 3,634,529
Patented Jan. 11, 1972

3,634,529
PREPARATION OF CYCLOPENTANE
George R. Lester, Park Ridge, Ill., assignor to Universal Oil Products Company, Des Plaines, Ill.
No Drawing. Filed Sept. 22, 1969, Ser. No. 860,049
Int. Cl. C07c 5/00, 13/10
U.S. Cl. 260—666 P            7 Claims

ABSTRACT OF THE DISCLOSURE

Cyclopentane is prepared by passing normal pentane over an alkalized supported noble metal catalyst at ambient pressure or a low pressure and at an elevated temperature to prepare the desired product.

---

This invention relates to a process for converting normal pentane to cyclopentane. More specifically, the invention is concerned with a process for passing normal pentane over a catalytic composition of matter of the type hereinafter set forth in greater detail at reaction conditions to form cyclopentane.

Cyclopentane is a useful compound in many chemical reactions. For example, it may be used per se as a solvent for cellulose ethers while the products which may result from the dehydrogenation of this compound are also useful. Cyclopentene may be used in organic synthesis or in the formation of plastics, while cyclopentadiene which is a further dehydrogenation product may be halogenated and thereafter used as an intermediate in the formation of insecticides or flame retardant agents. In addition to the aforementioned use of cyclopentane, it is also useful in raising the octane number of gasolines. For example, it possesses an octane number much higher than normal pentane which may be present in gasoline fractions. Normal pentane has an octane number of 62.6, determined by the motor method or 61.7 by the research method as compared to a motor octane number of 84.9, and research octane number of greater than 100, which are characteristic of cyclopentane. Likewise, the motor octane number of normal pentane with 3 cc. of lead added is 84.2 as compared to a motor octane number of 95.2 of cyclopentane with 3 cc. of lead added.

It is therefore an object of this invention to provide a novel method for converting normal pentane to cyclopentane.

Another object of this invention is to provide a novel method for converting normal pentane to cyclopentane by passing the former over certain catalytic compositions of matter whereby a cyclization reaction is effected to form the desired product.

In one aspect an embodiment of this invention resides in a process for the conversion of n-pentane to cyclopentane which comprises passing said n-pentane over a catalyst comprising a noble metal of Group VIII of the Periodic Table composited on a promoted solid support at an elevated temperature, and recovering the resultant cyclopentane.

A specific embodiment of this invention is found in the process for converting n-pentane to cyclopentane which comprises passing n-pentane over a catalyst comprising platinum composited on a lithiated alumina support at a temperature in the range of from about 250° to about 500° C. in the presence of a diluent gas which may contain various amounts of hydrogen, and recovering the desired cyclopentane.

Other objects and embodiments will be found in the following further detailed description of the present invention.

As hereinbefore set forth the present invention is concerned with a process for converting normal pentane to cyclopentane by passing the former over certain catalytic compositions of matter at reaction conditions of the type hereinafter set forth in greater detail. Some specific examples of the catalytic compositions of matter which may be used to effect the present process are the noble metals of Group VIII of the Periodic Table composited on a solid support which has been promoted by the addition of an alkali substance prior to impregnation with the noble metal. The term "promoted" as used in the present specification and in the appended claims, will refer to a pretreatment of the solid support, and particularly a metal oxide support, with a salt or hydroxide of a metal selected from the group consisting of alkali metals and alkaline earth metals such as lithium, sodium, potassium, rubidium, cesium, magnesium, calcium, strontium, and barium, said salts and hydroxides including lithium hydroxide, lithium nitrate, sodium hydroxide, sodium nitrate, potassium hydroxide, potassium nitrate, magnesium hydroxide, magnesium nitrate, calcium hydroxide, calcium nitrate, strontium hydroxide, strontium nitrate, etc. The particular salt or hydroxide which is used is one which will be converted to the oxide at the conditions under which the preparation of the catalyst is effected. Examples of solid supports which may be used will include such metal oxides as alumina, silica, or mixtures such as silica-alumina, silica-zirconia, silica-zirconia-alumina, silica-magnesia, etc. A particularly preferred solid support comprises alumina and specifically an alumina which possesses a relatively high surface area. One such alumina which falls within this category comprises gamma alumina which, in addition to possessing a relatively high surface area, is also substantially free from water. The catalyst is prepared by treating the desired support with a solution containing an alkaline substance such as the aforesaid alkali metal or alkaline earth metal, hydroxides, or salts in an amount so that the final promoted support will contain from about 0.2 to about 1% of the oxide, drying the resulting composite and thereafter calcining the promoted support at a temperature usually in a range of from about 500° to about 700° C.

Following this the promoted support is treated with a solution containing the noble metal of Group VIII of the Periodic Table, said solution containing a sufficient amount of the noble metal so that the finished composite after drying and calcination will contain from about 0.2 up to about 5% by weight of the noble metal. A specific example of the solution which may be used to impregnate the metal on the catalyst support is an acid solution such as chloroplatinic acid. Thereafter the composite is dried and calcined at a temperature ranging from about 500° to about 700° C. for a period ranging from about 1 to about 4 hours. Specific examples of these catalysts will comprise platinum composited on a lithiated alumina support, palladium composited on a lithiated alumina support, rhodium composited on a lithiated alumina support, osmium composited on a lithiated alumina support, iridium composited on a lithiated alumina support, ruthenium composited on a lithiated alumina support, platinum composited on a potassiated alumina support, palladium composited on a potassiated alumina support, rhodium composited on a potassiated alumina support, osmium composited on a potassiated alumina support, iridium composited on a potassiated alumina support, ruthenium composited on a potassiated alumina support, etc.

The reaction conditions under which the process of this invention are effected will include elevated temperatures ranging from about 250° up to about 500° C. and pressure ranging from ambient up to about 1000 p.s.i.g. The particular reaction conditions under which the process is effected will depend upon the particular composition of the products which are desired. Although the process of this invention is directed particularly to the conversion of normal pentane to cyclopentane, it is also possible to produce other products including olefins such as cyclopentene, the isomeric open chain pentenes, or lighter hydrocarbons. In addition, the choice of reaction conditions will be dependent upon whether the process is effected in a continuous manner with recycle or whether it is a batch type operation with no recycle of the unreacted products. For example, if a continuous type operation is used and the unreacted products are subjected to a recycle operation, it is possible to utilize a temperature within the lower range of the temperature conditions hereinbefore set forth, the side products being minimized with a concurrent production of a greater amount of the desired cyclopentane. Use of temperatures within the higher portion of the range hereinbefore set forth will result in a higher conversion of the normal pentane along with a corresponding higher production of products other than cyclopentane, namely, cyclopentene, n-pentene, and isopentene as well as small amounts of n-butane and propane.

It is also contemplated within the scope of this invention that the process may be effected in the presence of a diluent gas, said diluent gases including nitrogen, carbon dioxide, methane, water, helium, or mixtures of such gases with hydrogen such as a hydrogen-helium blend, etc. It has also been discovered that by utilizing a relatively small amount of a heterocyclic compound such as furan, thiophene, pyrrole, pyran, thiopyran, pyridine, etc. in an amount ranging from about 0.1 to about 0.5% along with a diluent gas such as water, hydrogen, etc., the amount of olefins, both open chain and cyclic, will be significantly reduced without substantially reducing the amount of the cyclopentane which is produced.

A process of this invention may be effected in any suitable manner and may comprise either a batch or continuous type operation. For example, when a batch type operation is used the quantity of the catalyst comprising a noble metal composited on a promoted metal oxide support is placed in an appropriate apparatus which may comprise a flask or a rotating autoclave, depending upon whether ambient pressures or super-atmospheric pressures are to be employed. Preferably speaking, the apparatus will comprise an autoclave of the rotating or mixing type. The normal pentane which is to undergo conversion to cyclopentane is charged to the reactor along with the diluent gas and the heterocyclic compound such as pyridine if such is to be employed. The apparatus is then heated to the desired operating temperatures and pressure, said temperature and pressure being dependent upon the desired composition of the converted product. The particular composition of the desired product, whether rich in cyclopentane or in olefinic components, either open chain or cyclic in configuration, was hereinbefore set forth. The conversion reaction is allowed to proceed for a predetermined period of time which may range from 0.5 up to about 10 hours or more in duration. Upon completion of the aforementioned reaction time, heating is discontinued an dthe apparatus allowed to return to room temperature. Any excess pressure is discharged and the reaction product is recovered. The product is separated from the catalyst, preferably by filtration, and thereafter the liquid portion is subjected to conventional means for recovery of the desired product, said conventional means including extraction, washing, drying, fractional distillation under reduced pressure, etc.

It is also contemplated within the scope of this invention that the reaction described herein may be effected in a continuous manner of operation. When such a type of operation is employed, the normal pentane is continuously charged to a reaction vessel containing the desired catalyst, said vessel being maintained at the proper operating conditions of temperature and pressure. In addition, a diluent gas of the type hereinbefore discussed is also charge to the reactor through a separate line and after a predetermined period of time has elapsed, the reactor effluent is continuously withdrawn. The effluent is then subjected to a work-up in a manner similar to that hereinbefore set forth whereby the desired product comprising cyclopentane is recovered while any n-pentane which has been unreacted is recycled to form a portion of the feed stock. In addition, the side-products such as olefinic hydrocarbons which are also produced during the reaction may also be recovered. Due to the fact that the catalytic composition of matter is in solid form, it is possible to use different types of operations. For example, one such method of continuous operation is the fixed bed method in which the catalyst is disposed as the fixed bed in the reactor while the normal pentane is passed through said reactor in either an upward or downward flow. Another type of operation which may be employed is the moving bed reaction in which the catalyst and the normal pentane are passed through the reaction zone either concurrently or countercurrently to each other. Yet another type of operation which may be used includes that in which the catalyst is carried into the reaction zone as a slurry in the normal pentane.

The following examples are given to illustrate the process of the present invention which, however, are not intended to limit the generally broad scope of the present invention in strict accordance therewith.

EXAMPLE I

In this example a catalyst comprising 0.5% of platinum composited on a carrier comprising 0.5% by weight of lithiated oxide on alumina was placed in a reactor. Normal pentane was continuously charged thereto using helium as a diluent gas. The pressure in the reactor was 25 p.s.i.g. and the experiment was repeated three times using temperatures of 363° C., 385° C., and 413° C. respectively. At each temperature, the effluent was analyzed. The weight distribution of the total product was determined by gas chromatographic analysis and is set forth in the following table. In this Table Run No. 1 utilized the 363° C. temperature; Run No. 2 utilized the 385° C. temperature; and Run No. 3 utilized the 413° C. temperature.

TABLE I

| Run Number | 1 | 2 | 3 |
| --- | --- | --- | --- |
| Propane | 1.1 | 1.1 | 2.4 |
| n-Butane | 0.8 | 1.1 | 2.0 |
| Isopentane | 0.8 | 0.5 | 1.4 |
| Normal pentane | 92.0 | 88.0 | 83.9 |
| Normal pentenes | 0.7 | 3.3 | 4.5 |
| Cyclopentane | 3.1 | 5.5 | 5.2 |
| Cyclopentene | 0.2 | 0.5 | 0.6 |

The percentage of conversion of normal pentane in the three runs was 6.7; 12.0; and 16.1% respectively. It is to be noted from the above table that a higher conversion of normal pentane was effected utilizing higher reaction temperatures. However, the percentage of selectivity to cyclopentane plus cyclopentene dropped from 49.3% when utilizing the lowest temperature to 36.4% when utilizing the highest temperature. In addition to a lower percentage of cyclization selectivity, there was an increase in the amount of normal pentenes as well as additional cracking products over that which was present when utilizing a lower temperature; therefore, it is readily apparent, as hereinbefore set forth, that the process may be effected over a relatively wide range of temperatures depending upon the partcular products which are desired and whether or not a recycle operation is contemplated.

EXAMPLE II

In this example another run was made utilizing the same type of catalyst as used in Example I and at a temperature of 365° C., the difference being that a hydrogen-helium blend containing 10% hydrogen and 90% helium was used as the carrier gas. Analyses of the reaction product disclosed that cyclopentene and normal pentenes were eliminated as products; however, this elimination was at the expense of additional cracking products containing from 1 to 4 carbon atoms.

EXAMPLE III

In this example a run was made at a temperature of 385° C. utilizing a catalyst comprising 0.5% by weight of platinum on a lithiated alumina support. The charge stock to the reactor in this experiment comprises n-pentane to which water and pyridine was added in an amount less than 1% of the charge. Analyses of the reaction product resulting from this reaction disclosed that the total amount of cyclopentene and n-pentenes was reduced from that found in Run 2 of Example I while the amount of cyclopentane which was obtained was approximately that which was obtained in the same experiment.

I claim as my invention:

1. A process for the conversion of n-pentane to cyclopentane which comprises passing an n-pentane charge over a catalyst comprising platinum on an alumina support promoted by an alkali metal compound, at a temperature of about 250° to 500° C., and recovering the resultant cyclopentane.

2. The process as set forth in claim 1 in which said catalyst comprises about 0.2 to 5 wt. percent platinum on a lithiated alumina support, said support containing about 0.2 to 1 wt. percent lithium oxide.

3. The process as set forth in claim 1 in which a diluent gas is admixed with said charge.

4. The process as set forth in claim 1 in which said alkali compound is lithium oxide.

5. The process as set forth in claim 3 in which said diluent gas is from about 0.5 to about 1% by weight of steam.

6. The process as set forth in claim 3 in which said diluent gas is hydrogen.

7. The process as set forth in claim 3 in which said diluent gas is helium.

References Cited

UNITED STATES PATENTS

| | | | |
|---|---|---|---|
| 3,296,324 | 1/1967 | Csicsery | 260—673 |
| 2,849,504 | 8/1958 | Kang et al. | 260—666 |

DELBERT E. GANTZ, Primary Examiner

V. O'KEEFE, Assistant Examiner